United States Patent
Hasselqvist

(10) Patent No.: US 11,427,892 B2
(45) Date of Patent: Aug. 30, 2022

(54) ALLOY FOR GAS TURBINE APPLICATIONS WITH HIGH OXIDATION RESISTANCE

(71) Applicant: Siemens Energy Global GmbH & Co. KG, Munich (DE)

(72) Inventor: Magnus Hasselqvist, Finspong (SE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 248 days.

(21) Appl. No.: 16/759,340

(22) PCT Filed: Oct. 24, 2018

(86) PCT No.: PCT/EP2018/079104
§ 371 (c)(1),
(2) Date: Apr. 26, 2020

(87) PCT Pub. No.: WO2019/101456
PCT Pub. Date: May 31, 2019

(65) Prior Publication Data
US 2020/0318220 A1      Oct. 8, 2020

(30) Foreign Application Priority Data
Nov. 24, 2017   (EP) .................................. 17203532

(51) Int. Cl.
| | |
|---|---|
| *C22C 19/05* | (2006.01) |
| *B33Y 70/00* | (2020.01) |
| *B33Y 80/00* | (2015.01) |
| *B22F 10/20* | (2021.01) |
| *B22F 10/28* | (2021.01) |
| *B33Y 10/00* | (2015.01) |
| *B22F 1/00* | (2022.01) |

(52) U.S. Cl.
CPC ............ *C22C 19/056* (2013.01); *B22F 10/20* (2021.01); *B22F 10/28* (2021.01); *B33Y 70/00* (2014.12); *B33Y 80/00* (2014.12); *B22F 1/0003* (2013.01); *B22F 2301/15* (2013.01); *B33Y 10/00* (2014.12)

(58) Field of Classification Search
CPC ..................................................... C22C 19/056
See application file for complete search history.

(56) References Cited

U.S. PATENT DOCUMENTS

| | | | |
|---|---|---|---|
| 10,221,468 B2 * | 3/2019 | Dial ....................... | C22C 19/057 |
| 10,577,679 B1 * | 3/2020 | Wessman ............... | C22C 19/056 |
| 2008/0001115 A1 | 1/2008 | Qiao et al. | |
| 2010/0296962 A1 | 11/2010 | Hasselqvist et al. | |
| 2013/0243642 A1 | 9/2013 | Kulkarni et al. | |
| 2017/0356068 A1 * | 12/2017 | Engeli ................... | C22C 1/0433 |
| 2019/0055627 A1 | 2/2019 | Nagatomi et al. | |

FOREIGN PATENT DOCUMENTS

| | | |
|---|---|---|
| CN | 101528959 A | 9/2009 |
| CN | 103354842 A | 10/2013 |
| JP | H04358037 A | 12/1992 |
| JP | 2007162041 A | 6/2007 |
| JP | 2019029606 A | 2/2019 |
| WO | 2017026519 A1 | 2/2017 |

OTHER PUBLICATIONS

PCT International Search Report and Written Opinion of International Searching Authority dated Feb. 14, 2019 corresponding to PCT International Application No. PCT/EP2018/079104 filed Oct. 24, 2018.

* cited by examiner

*Primary Examiner* — Christopher S Kessler

(57) ABSTRACT

A nickel base super alloy or blade alloy having Ni as a main constituent and the following elements or portions in wt %: Fe: 2 to 8, Al: 6.1 to 6.8, Cr: 12.5 to 15, W: 1.5 to 4.5, Ta: 2.5 to 5.5, Hf: 1.2 to 2, C: 0.03 to 0.13, B: 0.005 to 0.02, Zr: 0.005 to 0.02, and Si: 0.005 to 0.02.

21 Claims, No Drawings

ALLOY FOR GAS TURBINE APPLICATIONS WITH HIGH OXIDATION RESISTANCE

CROSS REFERENCE TO RELATED APPLICATIONS

This application is the US National Stage of International Application No. PCT/EP2018/079104 filed 24 Oct. 2018, and claims the benefit thereof. The International Application claims the benefit of European Application No. EP17203532 filed 24 Nov. 2017. All of the applications are incorporated by reference herein in their entirety.

FIELD OF INVENTION

The present invention relates to an alloy for gas turbine applications, particularly for components applied in the hot gas path of said turbines. The alloy is advantageously suitable to be applied or processed fire additive manufacturing methods, such as powder bed based methods. The alloy is advantageously a nickel-based and/or a superalloy.

Furthermore, the present invention relates to a powder material of said alloy and method of additively manufacturing a structure from the alloy, as well as a respective component comprising the structure.

Advantageously, the mentioned structure or component denotes a component applied in a turbo machine, e.g. in the flow path hardware of a gas turbine. The component is thus advantageously made of a superalloy or nickel-based alloy, particularly a precipitation hardened alloy.

The mentioned is further advantageously a rotor blade, a stator vane, a sealing component, shroud, a casing, a platform, or part of a heat shield, or any other comparable component of a turbo machine.

BACKGROUND OF INVENTION

The term "additive" in the context of manufacturing shall particularly denote a layer-wise, generative and/or bottom-up manufacturing process. The additive manufacturing as described herein may be or relate to rapid prototyping.

Additive manufacturing techniques comprise e.g. selective laser melting (SLM) or selective laser sintering (SLS) or electron beam melting (EBM).

A method of selective laser melting is described in EP 2 601 006 B 1, for example.

Additive manufacturing methods have been proven to be useful and advantages in the fabrication of prototypes or complex and filigree components, such as lightweight design or cooling components comprising mazelike internal structures. Further, additive manufacture stands out for its short chain of process steps, as a manufacturing step can be carried out directly based on corresponding CAD/CAM and/or construction data.

Powder bed manufacturing methods such as selective laser melting or selective laser sintering are relatively well known methods for fabricating, prototyping or manufacturing parts or components from powder material, for instance. Conventional apparatuses or setups for such methods usually comprise a manufacturing or build platform on which the component is built layer-by-layer after the feeding of a layer of base material which may then be melted, e.g. by the energy of a laser beam and subsequently solidified. The layer thickness is determined by a wiper that moves, e.g. automatically, over the powder bed and removes excess material. Typical layer thicknesses amount to 20 μm or 40 μm. During the manufacture, said laser beam scans over the surface and melts the powder on selected areas which may be predetermined by a CAD-file according to the geometry of the component to be manufactured.

Currently there is the demand to provide a material, advantageously an alloy, with high oxidation resistance, particularly on regions of the respective (gas turbine) component which are highly prone to wear or abrasion during operation, such as edge regions at the blade tips for example.

Said alloy is particularly desired for repair or refurbishment applications, particularly to repair and oxidation damage or to avoid an oxidation damage in advance, e.g. in a newly fabricated component.

A particular problem in providing said alloy with the desired properties is to find a favourable balance between mechanical strength, oxidation resistance and processability, i.e. to be able to weld process or build up the material by additive manufacturing techniques. We would like to have an alloy providing a very high oxidation resistance and an adequate resistance to thermal mechanical fatigue while not being more difficult to apply via processes like laser cladding or selective laser melting than e.g. IN738LC. The provided alloy susceptible to be provided with columnar crystalline, directionally solidified and/or single-crystal material structure.

Besides the mentioned laser cladding and selective laser melting, the provided alloy may as well be processable by/or with electron beam melting, so-called hot box welding, or conventional casting methods.

A disadvantages alternative to the provided alloy is e.g. to use hot box welding. Further, the very oxidation resistant blade alloy "Rene142" may be used. This is, however, a manual process required to be carried out by an operator working with a component held at above 900° C. Apparently this means a significant drawback concerning a stringent demand of automated processes, processibility and security aspects. Laser cladding using fairly oxidation resistant blade alloy "CM247CC" is a further option, which is, however, very difficult and thus expensive. Attempts to use the very oxidation resistant blade alloy STAL18Si, or comparable materials have failed due to its high Silicon content.

"MCrAlY" alloys are sometimes also applied, but these are too weak and/or brittle as to be used for build-up of structures of more than about 0.5 mm in thickness. Solution strengthened alloys such as the Co-based "Mer172" indeed provide a high oxidation resistance while being weldable by several means. But its mechanical strength or durability lies far beyond the strength of the mentioned blade alloys. The classical industrial gas turbine alloy "IN738LC" is more weldable than e.g. CM247CC and Rene142, but as well lacks comparable oxidation resistance. The main problem is that alloys which combine a high Al-content for oxidation resistance with at least a moderate amount of strengthening elements to get adequate thermal mechanical fatigue strength, tend to have poor weldability. Specifically, hot cracking during cooling from the molten state has to be mastered, when the grain boundaries have still not solidified while e.g. gamma prime phases (γ') have started to precipitate in the already solidified material such that the nearby material is so strong that it cannot accommodate the solidification strains.

SUMMARY OF INVENTION

It is, thus, an object of the present invention to provide means which help to overcome one or more of the mentioned drawbacks, particularly to provide an, e.g. nickel-based, (alloy) material with superior mechanical, thermal mechanical or corrosion properties and at the same time provide for a sufficient processability, e.g. by additive buildup techniques. More particularly, said alloy advantageously provides for favourable balance between mechanical and/or thermomechanical strength, oxidation resistance and processability, wherein e.g. each of these aspects are provided at a favourably high level.

The mentioned object is achieved by the subject-matters of the independent claims. Advantageous embodiments are subject-matter of the dependent claims.

A novel nickel-based alloy suitable as a material for turbine blades, is provided, the alloy comprising Ni (nickel) as a main constituent and the following elements or portions in %, advantageously wt % (weight percents): Fe (iron): 2 to 8, Al (aluminium): 6.1 to 6.8, Cr (chromium): 12.5 to 15, W (tungsten): 1.5 to 4.5, Ta (tantalum): 2.5 to 5.5, Hf (hafnium): 1.2 to 2, C (carbon): 0.03 to 0.13, B (boron): 0.005 to 0.02, Zr (zirconium): 0.005 to 0.02, and Si (silicon): 0.005 to 0.02. This alloy stands particularly out for its high oxidation resistance and adequate thermo-mechanical fatigue strength with still good hot cracking resistance, e.g. as comparable to that one of IN738LC.

In an embodiment, the alloy is a superalloy.

In an embodiment, the alloy is a blade alloy.

In an embodiment, the alloy comprises between 20 and 500 ppmw (parts per million by weight) of one or more of (reactive) elements, such as La (lanthanum), Ce (cerium) and Y (yttrium). Said (reactive) elements particularly award the alloy with a particular or yet increased oxidation resistance.

In an embodiment, the alloy comprises S (sulfur) at a level below 5 ppmw, advantageously below two ppmw. The sulfur level is particularly kept low, as said (free) sulfur reduces the cohesion of the metal/oxide interfaces, and thus reduces the cycling oxidation resistance.

In an embodiment, the alloy comprises 1.5 to 3.5, advantageously 2 wt % of W.

In an embodiment, the alloy comprises 2.5 to 4.5, advantageously 3 wt % of Ta.

In an embodiment, the alloy comprises 1.4 to 1.8, advantageously 1.5 wt % of Hf.

These embodiments allow for an advantageous (mechanical) strengthening of the alloy.

In an embodiment, the alloy comprises 0.03 to 0.09, advantageously 0.05 to 0.07 wt % of C.

In an embodiment, the alloy comprises 0.005 to 0.015, advantageously 0.01 wt % of B.

In an embodiment, the alloy comprises 0.005 to 0.015, advantageously 0.01 wt % of Zr.

These embodiments allow for an advantageous (mechanical) strengthening of the grain boundaries of the alloy, or as the case may be the final component.

B and Zr are particularly provided for awarding the alloy or as the case may be the final component with sufficient creep ductility. These elements but should, however, also be limited to avoid hot cracking during formation or buildup of the component, such as casting, SLM or laser cladding.

In an embodiment, the alloy comprises 5 to 7, advantageously 6, wt % of Fe.

In an embodiment, the alloy comprises 6.4 to 6.7, advantageously 6.55, wt % of Al.

In an embodiment, the alloy comprises 13.5 to 14.5, advantageously 14 wt % of Cr.

Each of these embodiments is of particular benefit for the overall mechanical, thermal mechanical or structural properties of the alloy.

In an (alternative) embodiment, the alloy comprises 2 to 4, advantageously 3, wt %, of Fe.

In an embodiment, the alloy comprises 6.1 to 6.4, advantageously 6.25 wt %, of Al, In an embodiment, the alloy comprises 13.5 to 14.5, advantageously 14 wt %, of Cr.

Each of these embodiments—being alternative to the previous three embodiments—is also of particular benefit for the overall mechanical, thermal mechanical or structural properties of the alloy.

In an embodiment, the alloy comprises 0.005 to 0.015, advantageously 0.01 wt % of Si. Si particularly improves and/or facilitates the formation of a protective oxide scale or shell. Simultaneously, the silicon level should be limited to avoid formation of hot cracking, e.g. during the additive buildup and/or post buildup processing techniques, such as thermal treatments.

Generally, is favourable, if the Hf portion/level is high, while the Zr and Si levels are fairly low e.g. to reduce the amount of residual fluid on the grain boundaries during solidification.

In an embodiment, the alloy comprises 0.005 to 0.015, advantageously 0.01 wt %, of Ce, La, Y.

Zr and Ce are actually useful and beneficial sulfur scavengers, but should at the same time be limited to a certain extent in order to avoid formation of hot cracking during formation or buildup of the component, such as casting, SLM or laser cladding.

In an embodiment, the alloy is—aside from unavoidable impurities—free of at least one of or all of the elements Co, Mo, Re, Ti and Nb.

In an embodiment, the alloy is free of most of the elements Co, Mo, Re, Ti and Nb.

In an embodiment, the alloy is free of all of the elements Co, Mo, Re, Ti and Nb.

In an embodiment, the alloy comprises low or moderate levels of Co, no Re, no Ti, and no Nb, wherein Ta is used as the main strengthening element in combination with a certain amount of Fe.

In an embodiment the alloy is configured such that a solvus solidus temperature is suppressed to or lies between 1140° C. and 1165° C., such as at 1150° C. Particularly, the Solvus temperature should not be suppressed down further, since a reasonable amount of γ' face for establishing an adequate thermo mechanical fatigue (TMF) resistance at a service temperature of 1050° C. is required. A solidus temperature in the given range hence allows to find a balance or optimal working point between strength and hot cracking resistance of the alloy.

It is, however, possible to further increase the Al and Fe levels (as compared to the ones described above) to provide an even higher oxidation resistance while having a similar solvus temperature at about 1150° C.

Another possibility for a beneficial alloy composition is to allow TCP (topologically close packed phase) phases precipitation up to 850° C. and reducing the Cr content to 13.5%, to enable more matrix and particle strengthening for the alloy.

In an embodiment, the alloy is (exclusively) composed or consisting of the following constituents: Ni as a base or main constituent, Fe: 2 to 8 wt %, Cr: 12 to 15 wt %, W: 1.5 to 4.5 wt %, Al: 6.1 to 6.8 wt %, Ta: 2.5 to 5.5 wt %, Hf: 1.2 to 2 wt %, C: 0.03 to 0.13 wt %, B: 0.005 to 0.02 wt %, Zr: 0.005 to 0.02 wt %, Si: 0.005 to 0.02 wt %, between 20 and 500 ppmw of one or more of Y, La, Ce, and, optionally, between 0.01 and 0.5 wt % of the sum of rare earths such as Sc, Y, the actinides and the lanthanides. Sc, Y, the actinides and the lanthaniclesare e.g. similar in the way they attract and neutralize impurities like sulfur.

A further aspect of the present invention relates to a powder material of the described alloy for the additive manufacture of the structure.

The powder may—particularly in case of SLM applications—comprise a powder size distribution spanning a range from 10 to 80 μm, advantageously from 40 to 60 μm, e.g. to an extent of at least 80%, wherein powder particles comprise, at least extensively, a spherical morphology which is characteristic for the synthesis or fabrication method, viz. gas or fluid atomization.

Further aspect of the present invention relates to a method of additive manufacturing of the structure and/or for the component, from an alloy or base material.

In an embodiment, the method is laser metal deposition or laser cladding. This is an advantageous embodiment.

In an alternative embodiment, the method is selective laser melting, selective laser sintering or electron beam melting method, and wherein a scan velocity of an energy beam, advantageously a laser beam, used for selective solidification of the powder is chosen from 400 mm/s to 2000 mm/s.

In an embodiment, the method is a casting method, such as investment or precision casting.

A further aspect of the present invention relates to a component, being or comprising the mentioned structure (manufactured by the method), wherein the component comprises—as compared to e.g. "IN738LC"—an increased oxidation resistance, an increased strength, such as thermal mechanical fatigue strength and an increased cracking resistance, such as hot cracking resistance.

Advantages or embodiments relating to the described alloy and/or the described powder may as well pertain to the method and/or the component, and vice versa.

DETAILED DESCRIPTION OF INVENTION

The novel alloy presented herein is a new blade alloy with a high oxidation resistance and adequate TMF strength with yet favourable hot cracking resistance, at least of and that one of the IN738LC level.

The alloy as described herein facilitates gamma prime precipitation in about the same manner as IN738LC on cooling from the molten state. Specifically, the solvus temperature has been reduced to the same level as in IN738LC to enable the already solidified material to accommodate the solidification strains in the same manner as for IN738LC. A key element here is the use of Fe to suppress the solvus temperature. Additionally, the Hf level is high while the Zr and Si levels are low to e.g. reduce the amount of residual fluid on the grain boundaries during solidification.

In addition or alternative to the above description, the presented alloy may comprise or be composed of nickel as a base constituent and the following portions/elements (prior to the element symbol), advantageously in wt %: 3 Fe, 14 Cr, 2 W, 6.2 Al, 3 Ta, 1.5 Hf, 0.08 C, 0.01 B, 0.01 Zr, 0.01 Si and 0.01 Ce. With 6.2% Al, 3% Ta and 1.5% Hf, the presented alloy is a high γ'-content alloy. Said prominent γ'-content is favorable.

As mentioned above, it is as well possible to further increase the Al and Fe levels to provide an even higher oxidation resistance while having a similar solvus temperature at about 1150° C. Thus, the presented alloy may comprise or be composed of nickel as a base constituent and the following portions/elements (prior to the element symbol), advantageously in wt %: 6 Fe, 14 Cr, 2 W, 6.6 Al, 3 Ta, 1.5 Hf, 0.05 C, 0.01 B, 0.01 Zr, 0.01 Si and 0.01 Ce.

Another possibility is to allow TCP precipitation up to 850° C. and reduce the Cr content to 13.5%, to enable more matrix and particle strengthening. Thus, the presented alloy may comprise or be composed of nickel as a base constituent and the following portions/elements (prior to the element symbol), advantageously in wt %: 6 Fe, 13.5 Cr, 3.5 W, 6.2 Al, 4.5 Ta, 1.5 Hf, 0.05 C, 0.01 B, 0.01 Zr, 0.01 Si and 0.01 Ce.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A nickel base alloy, comprising:
   Ni as a main constituent, and the following portions in wt %:
   Fe: 2 to 8,
   Al: 6.1 to 6.8,
   Cr: 12.5 to 15,
   W: 1.5 to 4.5,
   Ta: 2.5 to 5.5,
   Hf: 1.2 to 2, C: 0.03 to 0.13,
   B: 0.005 to 0.02,
   Zr: 0.005 to 0.02, and
   Si: 0.005 to 0.02.

2. The alloy according to claim 1, comprising:
   between 20 and 500 ppmw of an element selected from the group consisting of lanthanum, cerium, yttrium, and combinations thereof.

3. The alloy according to claim 1, comprising:
   sulfur at a level below 5 ppmw.

4. The alloy according to claim 1, comprising:
   1.5 to 3.5 wt % of W,
   2.5 to 4.5 wt % of Ta, and
   1.4 to 1.8 wt % of Hf.

5. The alloy according to claim 1, comprising
   0.03 to 0.09 wt % of C,
   0.005 to 0.015 wt % of B and
   0.005 to 0.015 wt % of Zr.

6. The alloy according to claim 1, comprising:
   5 to 7 wt % of Fe,
   6.4 to 6.7 wt % of Al, and
   13.5 to 14.5 wt % of Cr.

7. The alloy according to claim 1, comprising:
   2 to 4 wt % of Fe,
   6.1 to 6.4 wt % of Al, and
   13.5 to 14.5 wt % of Cr.

8. The alloy according to claim 1, comprising:
   0.005 to 0.015 wt % of Si.

9. The alloy according to claim 1, comprising:
   0.005 to 0.015 wt % of Ce, La, Y.

10. The alloy according to claim 1, wherein—aside from unavoidable impurities—the alloy is free of at least one of Co, Mo, Re, Ti and Nb.

11. The alloy according to claim 1, wherein the alloy is configured such that a solvus temperature is suppressed to or lies between 1140° C. and 1165° C.

12. The alloy according to claim 1 consisting of the following constituents:
   Ni as a main constituent,
   Fe: 2 to 8 wt %,
   Cr: 12 to 15 wt %, W: 1.5 to 4.5 wt %,
Al: 6.1 to 6.8 wt %,
Ta: 2.5 to 5.5 wt %,
Hf: 1.2 to 2 wt %,
C: 0.03 to 0.13 wt %,
B: 0.005 to 0.02 wt %,
Zr: 0.005 to 0.02 wt %,
Si: 0.005 to 0.02 wt %,
between 20 and 500 ppmw of one or more of Y, La, Ce, and
between 0.01 and 0.5 wt % of an element selected from the group consisting of Sc, Y, the actinides and the lanthanides.

13. A powder material comprising:
an alloy according to claim 1 for the additive manufacture of a structure.

14. A method of additive manufacturing a turbine component from an alloy base material according to claim 1, the method comprising:
using laser metal deposition to additively manufacture the turbine component.

15. The alloy according to claim 3, comprising:
sulfur at a level below 2 ppmw.

16. The alloy according to claim 4, comprising:
2 wt % of W,
3 wt % of Ta, and
1.5 wt % of Hf.

17. The alloy according to claim 5, comprising: 0.05 to 0.07 wt % of C, 0.01 wt % of B and 0.01 wt % of Zr.

18. The alloy according to claim 6, comprising:
6 wt % of Fe,
6.5 wt % of Al, and
14 wt % of Cr.

19. The alloy according to claim 7, comprising:
3 wt % of Fe,
6.25 wt % of Al, and
14 wt % of Cr.

20. The alloy according to claim 8, comprising:
0.01 wt % of Si.

21. The alloy according to claim 9, comprising:
0.01 wt % of Ce, La, Y.

* * * * *